(12) United States Patent
Jin et al.

(10) Patent No.: US 11,190,876 B2
(45) Date of Patent: Nov. 30, 2021

(54) MOBILE TERMINAL-BASED HAC SYSTEM AND IMPLEMENTATION METHOD THEREOF

(71) Applicant: JRD COMMUNICATION (SHENZHEN) LTD., Shenzhen (CN)

(72) Inventors: Xiulu Jin, Shenzhen (CN); Lingyun Sun, Shenzhen (CN)

(73) Assignee: JRD COMMUNICATION (SHENZHEN) LTD., Shenzhen (CN)

( * ) Notice: Subject to any disclaimer, the term of this patent is extended or adjusted under 35 U.S.C. 154(b) by 52 days.

(21) Appl. No.: 16/757,436

(22) PCT Filed: Oct. 22, 2018

(86) PCT No.: PCT/CN2018/111189
§ 371 (c)(1),
(2) Date: Apr. 20, 2020

(87) PCT Pub. No.: WO2019/076382
PCT Pub. Date: Apr. 25, 2019

(65) Prior Publication Data
US 2021/0195331 A1 Jun. 24, 2021

(30) Foreign Application Priority Data
Oct. 20, 2017 (CN) .......................... 201710984137.9

(51) Int. Cl.
*H04R 3/12* (2006.01)
*H01R 24/58* (2011.01)
(Continued)

(52) U.S. Cl.
CPC .............. *H04R 3/12* (2013.01); *H01R 24/58* (2013.01); *H01R 24/60* (2013.01); *H04R 9/046* (2013.01)

(58) Field of Classification Search
CPC .......... H04R 3/12; H04R 24/58; H04R 24/60; H04R 9/046; H04R 3/00; H04R 25/554; H04M 1/03; H04M 1/72478
See application file for complete search history.

(56) References Cited

U.S. PATENT DOCUMENTS

2002/0141545 A1   10/2002  Segovia
2003/0003864 A1*  1/2003   Locke ................... H04M 1/215
                                                       455/41.1
(Continued)

FOREIGN PATENT DOCUMENTS

CN         2750610 Y    1/2006
CN         1825860 A    8/2006
(Continued)

OTHER PUBLICATIONS

International search report,PCT/CN2018/111189, dated Jan. 28, 2019 (2 pages).

*Primary Examiner* — Yogeshkumar Patel

(57) ABSTRACT

Disclosed in the present invention are a mobile terminal-based HAC system and an implementation method thereof. The mobile terminal-based HAC system comprises a mobile terminal and a coil accessory; the coil accessory comprises an audio plug and a magnetic induction coil connected to the audio plug; the mobile terminal comprises a mobile terminal body, a main board, an audio interface circuit and an audio jack, the main board and the audio interface circuit are provided in the mobile terminal body, the audio jack is formed on a side edge of the mobile terminal body, and the main board, the audio interface circuit, and the audio jack are connected in sequence.

20 Claims, 2 Drawing Sheets

(51) Int. Cl.
*H01R 24/60* (2011.01)
*H04R 9/04* (2006.01)

(56) References Cited

U.S. PATENT DOCUMENTS

2012/0321115 A1* 12/2012 Jylanki ................ H04R 25/554
381/331
2015/0131827 A1* 5/2015 Hawker ............ H04M 1/72478
381/312

FOREIGN PATENT DOCUMENTS

| | | | |
|---|---|---|---|
| CN | 101803221 | A | 8/2010 |
| CN | 103269472 | A | 8/2013 |
| CN | 104735601 | A | 6/2015 |
| CN | 106416299 | A | 2/2017 |
| CN | 106851481 | A | 6/2017 |
| CN | 107786741 | A | 3/2018 |
| EP | 1271899 | A1 | 1/2003 |
| KR | 1020030096847 | A | 12/2003 |

* cited by examiner

MOBILE TERMINAL-BASED HAC SYSTEM AND IMPLEMENTATION METHOD THEREOF

TECHNICAL FIELD

The present disclosure relates to the technical field of audio application of mobile terminals, and in particular, to a mobile-terminal based HAC system.

BACKGROUND

For the hearing impaired, FCC (Federal Communications Commission) has enforced the HAC (Hearing Aid Compatibility) certification program for mobile phone manufacturers. Its HAC reference standard is ANSI C63.19 (United States National standard method for measuring the compatibility of wireless communication equipments and hearing aids). According to the standard definition, consumers can determine the compatibility of a certain type of hearing aid with a mobile phone according to an anti-interference level of the hearing aid and a corresponding mobile phone signal emission level.

When designing a mobile phone corresponding to compatibility with a hearing aid, an additional inductive coil is required as an antenna. Some manufacturers add the coil into a receiver to make a special HAC receiver. When a hearing aid is set to a T position, magnetic field generated by the induction coil in the phone can be picked up by the hearing aid and converted into an amplified electrical signal. Moreover, because a microphone stops working at this time, influence of environmental noise is greatly reduced. However, with larger and larger screen occupation ratios of mobile phones, and even the trend of launching full-screen mobile phones, such mobile phones have lost dedicated HAC design space, which has brought inconvenience to people with hearing disabilities using mobile phones.

Therefore, the prior art requires improvement and optimization.

SUMMARY

A mobile-terminal based HAC system, comprising a mobile terminal and a coil accessory;
wherein, the coil accessory comprises an audio plug and a magnetic induction coil connected to the audio plug;
the mobile terminal comprises a mobile terminal body, a main board, an audio interface circuit and an audio jack adapted to the audio plug, the main board and the audio interface circuit are disposed in the mobile terminal body, the audio jack is disposed on a side edge of the mobile terminal body, and the main board, the audio interface circuit, and the audio jack are connected in sequence;
the main board is configured to set and detect working modes of the mobile terminal, and further configured to output preset audio signals corresponding to the working modes of the mobile terminal, wherein the preset audio signals include a first type of audio signal for driving an earphone inserted in the audio jack and a second type of audio signal for driving the magnetic induction coil;
the audio interface circuit is configured to filter the first type of audio signal and filter and amplify the second type of audio signal
A mobile-terminal based HAC system, comprising a mobile terminal and a coil accessory;
wherein, the coil accessory comprises an audio plug and a magnetic induction coil connected to the audio plug;
the mobile terminal comprises a mobile terminal body, a main board, an audio interface circuit and an audio jack adapted to the audio plug, the main board and the audio interface circuit are disposed in the mobile terminal body, the audio jack is disposed on a side edge of the mobile terminal body, and the main board, the audio interface circuit, and the audio jack are connected in sequence.

An method for implementing a mobile terminal-based HAC system, wherein, the mobile-terminal based HAC system comprises a mobile terminal and a coil accessory;
the coil accessory comprises an audio plug and a magnetic induction coil connected to the audio plug;
the mobile terminal comprises a mobile terminal body, a main board, an audio interface circuit and an audio jack adapted to the audio plug, the main board and the audio interface circuit are disposed in the mobile terminal body, the audio jack is disposed on a side edge of the mobile terminal body, and the main board, the audio interface circuit, and the audio jack are connected in sequence;
wherein, the method comprises the following steps:
by the main board, setting working modes of the mobile terminal, wherein the working modes includes a HAC mode and a normal mode;
in the HAC mode, when the main board detects that the coil accessory is inserted in the audio jack, using the main board to output the right channel audio signal, using the audio interface circuit to process the right channel audio signal to obtain a coil driving signal, and outputting the coil driving signal to the coil accessory to drive the magnetic induction coil to work;
in the HAC mode, when the main board detects that an earphone is inserted in the audio jack, not outputting any audio signal;
in the normal mode, when the main board detects that the coil accessory is inserted in the audio jack, not outputting any audio signal;
in the normal mode, when the main board detects that an earphone is inserted in the audio jack, using the main board to respectively output the left channel audio signal and the right channel audio signal, using the audio interface circuit to process the left channel audio signal and the right channel audio signal, and using both the left channel audio signal and the right channel audio signal after being processed to drive the earphone to work.

Figure 1:
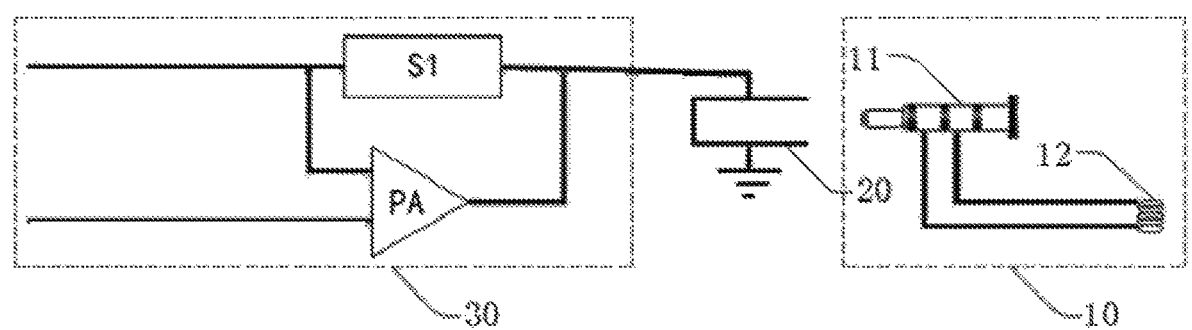
FIG. 1 is a system block diagram of an embodiment of a mobile terminal-based HAC system provided by the present disclosure.

In the drawings:
10: coil accessory; 11: audio plug; 12: magnetic induction coil; 20: audio jack; 30: audio interface circuit; 31: left channel audio signal output circuit; 32: right channel audio signal output circuit; 33: microphone input circuit.

DETAILED DESCRIPTION

In view of the defect of the above prior art, a purpose of the present disclosure is to provide a mobile-terminal based HAC system, which can enable a mobile terminal to achieve a hearing aid compatibility function, while does not occupy design space of the mobile terminal.

In order to make purposes, technical solutions, and effect of the present disclosure be clearer and more explicit, the present disclosure is further described in detail below with reference to the drawings and provided embodiments. It should be understood that the specific embodiments described herein are only intended to illustrate but not to limit the present disclosure.

Referring to FIG. 1, which is a system block diagram of a mobile terminal-based HAC system provided by the present disclosure. The mobile terminal-based HAC system comprises a mobile terminal (not shown in the drawings) and a coil accessory 10.

The coil accessory 10 comprises an audio plug 11 and a magnetic induction coil 12 connected to the audio plug 11.

The mobile terminal 10 comprises a mobile terminal body (not shown in the drawings), a main board (not shown in the drawings), an audio interface circuit 30 and an audio jack 20, the main board and the audio interface circuit 30 are disposed in the mobile terminal body, the audio jack 20 is disposed on a side edge of the mobile terminal body, and the main board, the audio interface circuit 30, and the audio jack 20 are connected in sequence.

By the plug-in cooperation between the audio jack 20 and the audio plug 11, a detachable connection between the coil accessory 10 and the mobile terminal can be achieved. When a user uses the mobile terminal, in the condition that it is not required to use the hearing aid compatibility function, the coil accessory 10 can be removed to prevent obstructing use of the mobile terminal; in the condition that it is required to use the function of the hearing aid compatibility, the coil attachment 10 can be mounted on the mobile terminal to achieve its hearing aid compatibility function and reduce environmental noise.

Here, the mobile terminal is a full-screen mobile phone, that is, a mobile phone with a screen occupation ratio of more than 90% and an ultra-narrow frame design. Under the development trend of larger and larger screen occupation ratios of smart phones, more and more mobile phones have to cancel the HAC function; however, the mobile terminal-based HAC system provided by the present invention does not require occupying too much design space of the mobile phone, that is, ensures a screen occupation ratio of the mobile terminal, and also enables the mobile terminal to achieve the function of hearing aid compatibility, which ensures use of this type of full-screen mobile phone by hearing impaired people.

Figure 2:
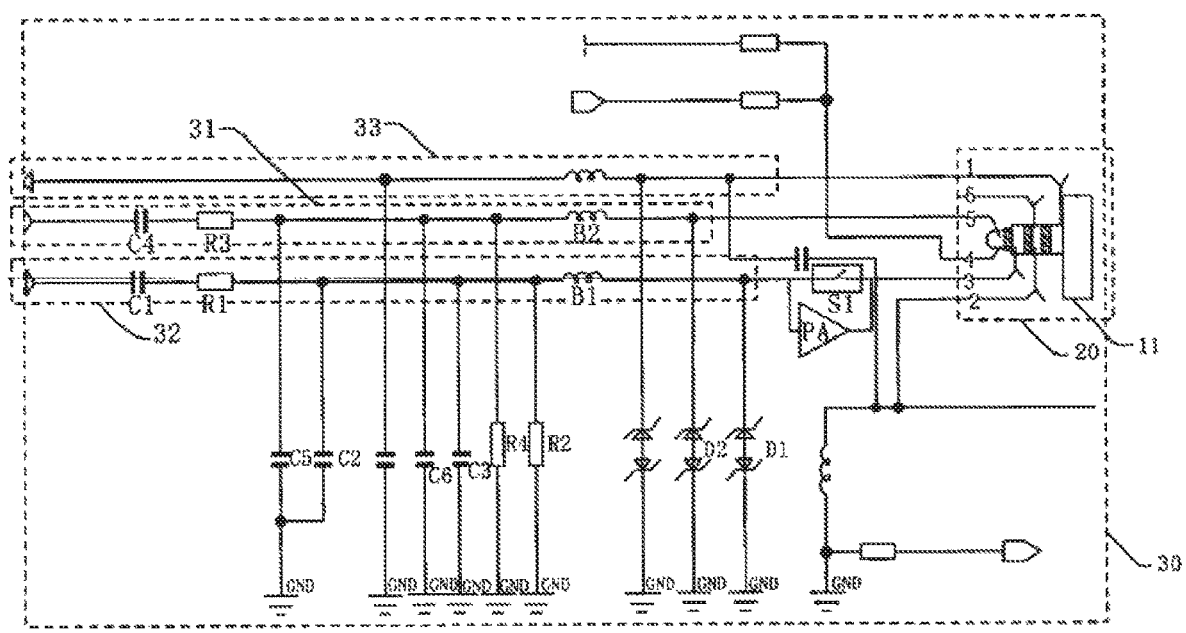
FIG. 2 is a circuit principle diagram of an embodiment of a mobile terminal-based HAC system provided by the present disclosure.

In a further embodiment, referring to FIG. 2, which is a circuit principle diagram of a preferred embodiment of a mobile terminal-based HAC system provided by the present disclosure. The audio interface circuit 30 comprises:
 a left channel audio signal output circuit 31;
 a right channel audio signal output circuit 32;
 an audio power amplifier PA;
 wherein, the main board, when detecting that an earphone is inserted in the audio jack 20, respectively outputs a left channel audio signal and a right channel audio signal to the left channel audio signal output circuit 31 and the right channel audio signal output circuit 32 to be filtered, and uses both the left channel audio signal and the right channel audio signal after being filtered to drive the earphone to work;
 when the main board detects that the coil accessory is inserted in the audio jack 20, the right channel audio signal output by the main board is filtered by the right channel audio signal output circuit 32 and then output to the audio power amplifier, and is amplified by the audio power amplifier to obtain a coil driving signal, which is output to the coil accessory 10 and drives the magnetic induction coil 12 to work.

Wherein, the main board comprises:
 a setting module configured to set working modes of the mobile terminal, wherein the working modes include a HAC mode and a normal mode;
 a detecting module configured to detect whether the coil accessory 10 or an earphone is inserted in the audio jack 20;
 a driving module configured to respectively output a left channel audio signal and a right channel audio signal to the earphone to drive the earphone to work when detecting that the earphone is inserted in the audio jack 20, and output a right channel audio signal to the coil accessory 10 to drive the coil accessory 10 to work when detecting that the coil accessory 10 is inserted in the audio jack.

The audio power amplifier PA is disposed at an output end of the right channel audio signal output circuit 32, and is connected to the audio jack 20. The audio power amplifier PA can amplify an audio signal output through the right channel audio signal output circuit 32 by the main board, and then transmit the amplified audio signal through the audio jack 20 and the audio plug 11 to the magnetic induction coil 12 to drive the magnetic induction coil 12 to work. The generated magnetic field can be picked up by a hearing aid and converted into an amplified electric signal, and thus influence of environmental noise is greatly reduced.

Generally, a detecting module of a main board is connected to a left channel audio signal output circuit of a mobile phone, therefore, disposing the audio power amplifier PA in the right channel audio signal output circuit 32 will not affect detection for plugging in and out behaviors of the earphone or the coil accessory. Moreover, a speaker drive power amplifier of the mobile phone itself can be connected to the left channel audio signal output circuit 31 and separated from the audio amplifier PA, so that the two are driven using different audio signals.

In a further embodiment, the audio interface circuit 30 further comprises a switch S1, an inverting input end of the audio power amplifier PA is connected to both an input end of the right channel audio signal output circuit 32 and an end of the switch S1, a non-inverting input end of the audio power amplifier PA is grounded, and an output end of the audio power amplifier PA is connected to both the audio jack 20 and another end of the switch S1. In the condition that the audio power amplifier PA is turned on, a situation of signal backflow may occur, such that power supply of the mobile phone become abnormal and other functional modules of the mobile phone are influenced. Therefore, by turning off the switch S1 when the audio power amplifier PA is turned on, signal backflow can be avoided.

In a preferred embodiment, the right channel audio signal output circuit 32 comprises a first capacitor C1, a second capacitor C2, a third capacitor C3, a first resistor R1, a second resistor R2, a first magnetic bead B1, and a first TVS diode D1, one end of the first capacitor C1 is connected to the main board, another end of the first capacitor C1 is connected to one end of the first resistor R1, another end of the first resistor R1 is connected to one end of the first magnetic bead B1, the another end of the first resistor R1 is further grounded via the second capacitor C2, the third capacitor C3, and the second resistor R2 respectively, another end of the first magnetic bead B1 is connected to the inverting input end of the audio power amplifier PA, the another end of the first magnetic bead B1 is further grounded via the first TVS diode D1. The right channel audio signal output circuit 32 can perform a filtering process for an audio signal output by the main board using the aforementioned elements, so that the main board outputs an audio signal with less interference, and can accurately drive the coil accessory 10 or the earphone to work.

In a preferred embodiment, the left channel audio signal output circuit 31 comprises a fourth capacitor C4, a fifth capacitor C5, a sixth capacitor C6, a third resistor R3, a fourth resistor R4, a second magnetic bead B2, and a second TVS diode D2, an end of the fourth capacitor C4 is connected to the main board, another end of the fourth capacitor C4 is connected to an end of the third resistor R3, another end of the third resistor R3 is connected to an end of the second magnetic bead B2, the another end of the third resistor R3 is further grounded via the fifth capacitor C5, the six capacitor C6, and the fourth resistor R4 respectively, another end of the second magnetic bead B2 is connected to the audio jack 10, the another end of the second magnetic bead 20 is further grounded via the second TVS diode D2. The left channel audio signal output circuit 31 has a disposing manner similar to that of the right channel audio signal output circuit 32, and can also perform a filtering process for an audio signal output by the main board using the aforementioned elements, so that the main board outputs an audio signal with less interference, and can accurately drive the coil accessory 10 or the earphone to work.

Preferably, the audio interface circuit 30 further comprises a microphone input circuit 33, one end of the microphone input circuit 33 is connected to the audio jack 20, another end of the microphone input circuit 33 is connected to the main board. Through the microphone input circuit 33, a microphone voice signal can be input into the audio interface circuit 20. Herein, it needs to be emphasized that specific circuit connection manners of the microphone input circuit 33 mentioned by the present disclosure and other unspecified circuits in FIG. 2 can be achieved by existing disposing manners or experience for those skilled in the art, therefore the present disclosure does not repeat specific structures of these circuits.

Here, the audio jack 20 is disposed on a top part of the mobile terminal body. Based on habits of most users using mobile phones to answer calls, disposing the audio jack 20 on the top part of the mobile terminal body can make the coil accessory 10 connected thereto be close to a hearing aid worn by a user, which facilitates the role of the magnetic induction coil 12. In addition, the audio jack 20 is a 3.5 mm headphone jack, and the audio plug 11 is a 3.5 mm headphone plug, so that the connection structure is standardized and simplified, has low implementation cost, and thus is applicable to most existing mobile terminals. Of course, in other embodiments, it is also possible to use other types of audio jacks 20, such as a Lightning interface, a Type-c interface, etc., so as to adapt to the development trend of mobile phones.

The present disclosure further provides a method for implementing the above mobile terminal-based HAC system, the method comprises the following steps:

by the main board, setting working modes of the mobile terminal, wherein the working modes includes a HAC mode and a normal mode;

in the HAC mode, when the main board detects that the coil accessory is inserted in the audio jack, the main board outputs the right channel audio signal, which is filtered by the right channel audio signal output circuit and then output to the audio power amplifier, and is amplified by the audio power amplifier to obtain a coil driving signal, which is output to the coil accessory and drives the magnetic induction coil to work;

in the HAC mode, when the main board detects that the earphone is inserted in the audio jack, no audio signal is output;

in the normal mode, when the main board detects that the coil accessory is inserted in the audio jack, no audio signal is output;

in the normal mode, when the main board detects that the earphone is inserted in the audio jack, the main board respectively outputs the left channel audio signal and the right channel audio signal to the left channel audio signal output circuit and the right channel audio signal output circuit to be filtered, and uses both the left channel audio signal and the right channel audio signal after being filtered to drive the earphone to work.

In particular, in the HAC mode, the mobile terminal amplifies an audio signal output by the right channel audio signal output circuit 32 using the audio power amplifier PA, and transmits the amplified audio signal through the audio jack 20 and the audio plug 11 to the magnetic induction coil 12 to drive the magnetic induction coil 12 to work, so that the generated magnetic field can be picked up by a hearing aid and converted into an amplified electric signal, and thus influence of environmental noise is greatly reduced. Moreover, when a user does not enter the HAC mode, that is, in the normal mode, the using manner of the mobile terminal is similar to a using manner of a normal mobile terminal, so that normal use of an ordinary user is not affected.

In a further embodiment, the method further comprises the following step: the main board, when detecting that the earphone is inserted into the audio jack, controls the audio power amplifier to stop working. In this embodiment, the earphone and the coil accessory shares one audio jack 20, while a general earphone interface circuit has no additional power amplifier, therefore, when the earphone is connected to the audio interface circuit 30 provided by the present disclosure, if the audio power amplifier is not turned off, it is possible that the earphone is burnt because of too large earphone drive current and use of the user is influenced. A developer can design software in advance, so that the mobile terminal uses the main board to prohibit the turning-on behavior of the audio power amplifier PA in the condition that the earphone is inserted.

In conclusion, the present disclosure provides a mobile-terminal based HAC system and an implementation method thereof, the mobile terminal-based HAC system comprises a mobile terminal and a coil accessory; the coil accessory comprises an audio plug and a magnetic induction coil connected to the audio plug; the mobile terminal comprises a mobile terminal body, a main board, an audio interface circuit and an audio jack, the main board and the audio interface circuit are disposed in the mobile terminal body, the audio jack is disposed on a side edge of the mobile terminal body, and the main board, the audio interface circuit, and the audio jack are connected in sequence. The present disclosure can enable a mobile terminal to achieve a hearing aid compatibility function on the premise of not occupying design space of the mobile terminal, and the obtained mobile terminal-based HAC system has advantages of low implementation cost and simple debug.

It can be understood that one of ordinary skill in the art can make equivalent replacements or changes according to the technical solutions of the present disclosure and invention concepts thereof, and all of these changes or replacements should belong to the protection scope of appended claims of the present disclosure.

What is claimed is:

1. A mobile-terminal based HAC system, comprising a mobile terminal and a coil accessory;
    wherein, the coil accessory comprises an audio plug and a magnetic induction coil connected to the audio plug;
    the mobile terminal comprises a mobile terminal body, a main board, an audio interface circuit and an audio jack adapted to the audio plug, the main board and the audio interface circuit are disposed in the mobile terminal body, the audio jack is disposed on a side edge of the mobile terminal body, and the main board, the audio interface circuit, and the audio jack are connected in sequence;
    the main board is configured to set and detect working modes of the mobile terminal, and further configured to output preset audio signals corresponding to the working modes of the mobile terminal, wherein the preset audio signals include a first type of audio signal for driving an earphone inserted in the audio jack and a second type of audio signal for driving the magnetic induction coil;
    the audio interface circuit is configured to filter the first type of audio signal and filter and amplify the second type of audio signal.

2. The mobile terminal-based HAC system according to claim 1, wherein, the audio interface circuit comprises a left channel audio signal output circuit, a right channel audio signal output circuit, an audio power amplifier, a switch and a microphone input circuit, an inverting input end of the audio power amplifier is connected to both an input end of the right channel audio signal output circuit and an end of the switch, a non-inverting input end of the audio power amplifier is grounded, an output end of the audio power amplifier is connected to both the audio jack and another end of the switch; one end of the microphone input circuit is connected to the audio jack, and another end of the microphone input circuit is connected to the main board.

3. The mobile terminal-based HAC system according to claim 2, wherein, the right channel audio signal output circuit comprises a first capacitor, a second capacitor, a third capacitor, a first resistor, a second resistor, a first magnetic bead, and a first TVS diode, one end of the first capacitor is connected to the main board, another end of the first capacitor is connected to one end of the first resistor, another end of the first resistor is connected to one end of the first magnetic bead, the another end of the first resistor is further grounded via the second capacitor, the third capacitor, and the second resistor respectively, another end of the first magnetic bead is connected to the inverting input end of the audio power amplifier, the another end of the first magnetic bead is further grounded via the first TVS diode.

4. The mobile terminal-based HAC system according to claim 2, wherein,
    the left channel audio signal output circuit comprises a fourth capacitor, a fifth capacitor, a sixth capacitor, a third resistor, a fourth resistor, a second magnetic bead, and a second TVS diode, an end of the fourth capacitor is connected to the main board, another end of the fourth capacitor is connected to an end of the third resistor, another end of the third resistor is connected to an end of the second magnetic bead, the another end of the third resistor is further grounded via the fifth capacitor, the six capacitor, and the fourth resistor respectively, another end of the second magnetic bead is connected to the audio jack, the another end of the second magnetic bead is further grounded via the second TVS diode.

5. A mobile terminal-based HAC system, comprising a mobile terminal and a coil accessory;
    wherein, the coil accessory comprises an audio plug and a magnetic induction coil connected to the audio plug;
    the mobile terminal comprises a mobile terminal body, a main board, an audio interface circuit and an audio jack adapted to the audio plug, the main board and the audio interface circuit are disposed in the mobile terminal body, the audio jack is disposed on a side edge of the mobile terminal body, and the main board, the audio interface circuit, and the audio jack are connected in sequence.

6. The mobile terminal-based HAC system according to claim 5, wherein, the audio interface circuit comprises:
    a left channel audio signal output circuit;
    a right channel audio signal output circuit;
    an audio power amplifier;
    wherein, the main board, when detecting that an earphone is inserted in the audio jack, respectively outputs the left channel audio signal and the right channel audio signal to the left channel audio signal output circuit and the right channel audio signal output circuit to be filtered, and uses both the left channel audio signal and the right channel audio signal after being filtered to drive the earphone to work;
    when the main board detects that the coil accessory is inserted in the audio jack, the right channel audio signal output by the main board is filtered by the right channel audio signal output circuit and then output to the audio power amplifier, and is amplified by the audio power amplifier to obtain a coil driving signal, which is output to the coil accessory and drives the magnetic induction coil to work.

7. The mobile terminal-based HAC system according to claim 5, wherein, the main board comprises:
    a setting module configured to set working modes of the mobile terminal, wherein the working modes include a HAC mode and a normal mode;
    a detecting module configured to detect whether the coil accessory or an earphone is inserted in the audio jack;
    a driving module configured to respectively output a left channel audio signal and a right channel audio signal to the earphone to drive the earphone to work when detecting that the earphone is inserted in the audio jack, and output a right channel audio signal to the coil accessory to drive the coil accessory to work when detecting that the coil accessory is inserted in the audio jack.

8. The mobile terminal-based HAC system according to claim 6, wherein, the audio interface circuit further comprises a switch, an inverting input end of the audio power amplifier is connected to both an input end of the right channel audio signal output circuit and an end of the switch, a non-inverting input end of the audio power amplifier is grounded, an output end of the audio power amplifier is connected to both the audio jack and another end of the switch.

9. The mobile terminal-based HAC system according to claim 6, wherein, the audio interface circuit further comprises a microphone input circuit, one end of the microphone input circuit is connected to the audio jack, another end of the microphone input circuit is connected to the main board, and the audio jack is disposed at a top part of the mobile terminal body.

10. The mobile terminal-based HAC system according to claim 5, wherein, the right channel audio signal output circuit comprises a first capacitor, a second capacitor, a third capacitor, a first resistor, a second resistor, a first magnetic bead, and a first TVS diode, one end of the first capacitor is connected to the main board, another end of the first capacitor is connected to one end of the first resistor, another end of the first resistor is connected to one end of the first magnetic bead, the another end of the first resistor is further grounded via the second capacitor, the third capacitor, and the second resistor respectively, another end of the first magnetic bead is connected to the inverting input end of the audio power amplifier, the another end of the first magnetic bead is further grounded via the first TVS diode.

11. The mobile terminal-based HAC system according to claim 5, wherein, the left channel audio signal output circuit comprises a fourth capacitor, a fifth capacitor, a sixth capacitor, a third resistor, a fourth resistor, a second magnetic bead, and a second TVS diode, an end of the fourth capacitor is connected to the main board, another end of the fourth capacitor is connected to an end of the third resistor, another end of the third resistor is connected to an end of the second magnetic bead, the another end of the third resistor is further grounded via the fifth capacitor, the six capacitor, and the fourth resistor respectively, another end of the second magnetic bead is connected to the audio jack, the another end of the second magnetic bead is further grounded via the second TVS diode.

12. A method for implementing a mobile terminal-based HAC system, wherein, the mobile-terminal based HAC system comprises a mobile terminal and a coil accessory;
the coil accessory comprises an audio plug and a magnetic induction coil connected to the audio plug;
the mobile terminal comprises a mobile terminal body, a main board, an audio interface circuit and an audio jack adapted to the audio plug, the main board and the audio interface circuit are disposed in the mobile terminal body, the audio jack is disposed on a side edge of the mobile terminal body, and the main board, the audio interface circuit, and the audio jack are connected in sequence;
wherein, the method comprises the following steps:
by the main board, setting working modes of the mobile terminal, wherein the working modes includes a HAC mode and a normal mode;
in the HAC mode, when the main board detects that the coil accessory is inserted in the audio jack, using the main board to outputs the right channel audio signal, using the audio interface circuit to process the right channel audio signal to obtain a coil driving signal, and outputting the coil driving signal to the coil accessory to drive the magnetic induction coil to work;
in the HAC mode, when the main board detects that an earphone is inserted in the audio jack, not outputting any audio signal;
in the normal mode, when the main board detects that the coil accessory is inserted in the audio jack, not outputting any audio signal;
in the normal mode, when the main board detects that an earphone is inserted in the audio jack, using the main board to respectively outputs the left channel audio signal and the right channel audio signal, using the audio interface circuit to process the left channel audio signal and the right channel audio signal, and using both the left channel audio signal and the right channel audio signal after being processed to drive the earphone to work.

13. The method according to claim 12, further comprising the followings step: when the main board detects that an earphone is inserted in the audio jack, controlling the audio interface circuit to stop working.

14. The method according to claim 12, wherein, the audio interface circuit comprises a left channel audio signal output circuit, a right channel audio signal output circuit, an audio power amplifier, a switch and a microphone input circuit, an inverting input end of the audio power amplifier is connected to both an input end of the right channel audio signal output circuit and an end of the switch, a non-inverting input end of the audio power amplifier is grounded, an output end of the audio power amplifier is connected to both the audio jack and another end of the switch; one end of the microphone input circuit is connected to the audio jack, and another end of the microphone input circuit is connected to the main board.

15. The method according to claim 14, wherein, the right channel audio signal output circuit comprises a first capacitor, a second capacitor, a third capacitor, a first resistor, a second resistor, a first magnetic bead, and a first TVS diode, one end of the first capacitor is connected to the main board, another end of the first capacitor is connected to one end of the first resistor, another end of the first resistor is connected to one end of the first magnetic bead, the another end of the first resistor is further grounded via the second capacitor, the third capacitor, and the second resistor respectively, another end of the first magnetic bead is connected to the inverting input end of the audio power amplifier, the another end of the first magnetic bead is further grounded via the first TVS diode.

16. The method according to claim 14, wherein, the left channel audio signal output circuit comprises a fourth capacitor, a fifth capacitor, a sixth capacitor, a third resistor, a fourth resistor, a second magnetic bead, and a second TVS diode, an end of the fourth capacitor is connected to the main board, another end of the fourth capacitor is connected to an end of the third resistor, another end of the third resistor is connected to an end of the second magnetic bead, the another end of the third resistor is further grounded via the fifth capacitor, the six capacitor, and the fourth resistor respectively, another end of the second magnetic bead is connected to the audio jack, the another end of the second magnetic bead is further grounded via the second TVS diode.

17. The method according to claim 12, wherein, the audio jack is disposed at a top part of the mobile terminal body.

18. The method according to claim 12, further comprising: in the HAC mode, when the magnetic induction coil is driven to work, using a hearing aid to pick up the magnetic field generated by the magnetic induction coil and convert the magnetic field into an amplified electric signal.

19. The method according to claim 12, further comprising: using the main board to prohibit the turning-on behavior of the audio power amplifier PA in the condition that the earphone is inserted.

20. The method according to claim 14, further comprising: turning off the switch when the audio power amplifier is turned on.

* * * * *